Figure 1:
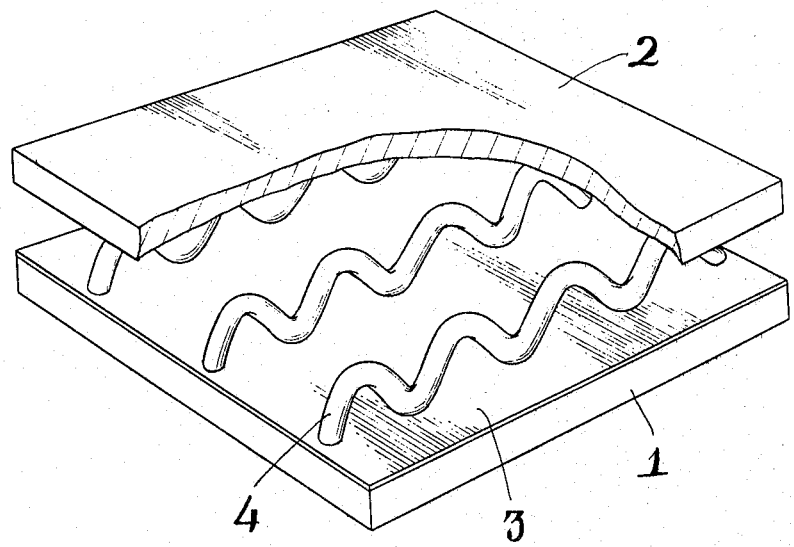

United States Patent [19]

Hamano

[11] 3,897,624
[45] Aug. 5, 1975

[54] METHOD FOR BONDING CERAMICS WITH METAL

[75] Inventor: Yoshiteru Hamano, Osaka, Japan

[73] Assignee: Agency of Industrial Science & Technology, Tokyo, Japan

[22] Filed: Mar. 30, 1970

[21] Appl. No.: 23,701

[30] Foreign Application Priority Data
Apr. 8, 1969  Japan............................... 44-27452

[52] U.S. Cl.............................. 228/122; 228/238
[51] Int. Cl............................................. B23k 31/02
[58] Field of Search............. 29/471.9, 472.1, 472.5, 29/473.1, 471.1

[56] References Cited
UNITED STATES PATENTS

| | | | |
|---|---|---|---|
| 2,235,680 | 3/1941 | Hoven et al. | 29/471.9 X |
| 2,722,496 | 11/1955 | Hosmer | 29/473.1 |
| 2,996,401 | 8/1961 | Welch et al. | 29/473.1 X |
| 3,071,187 | 1/1963 | Fairbanks | 29/471.1 X |
| 3,171,519 | 3/1965 | Nolte | 29/473.1 X |
| 3,284,176 | 11/1966 | Reed et al. | 29/473.1 X |
| 3,345,734 | 10/1967 | Sowko | 29/471.9 X |
| 3,346,933 | 10/1967 | Lindsay | 29/473.1 X |
| 3,347,704 | 10/1967 | Mayer | 29/472.5 X |
| 3,384,400 | 5/1968 | Sandhogen | 403/30 |
| 3,444,615 | 5/1969 | Anderson et al. | 29/471.1 X |
| 3,479,731 | 11/1969 | Mantel et al. | 29/471.1 X |

*Primary Examiner*—Francis S. Husar
*Assistant Examiner*—Ronald J. Shore
*Attorney, Agent, or Firm*—Ernest G. Montague; Karl F. Ross; Herbert Dubno

[57] ABSTRACT

A paste composed of glass having a low fusion point and metal powder is fired on a ceramic material to form a very thin metallic film thereon. A metal body of easily deformable shape is then sandwitched between this film and the metal material to which the ceramic material is to be bonded and the contact points on either side are bonded to the respective materials by firing. The bonded ceramic-metal body so formed is stable in it's mechanical, heat and electrical properties and is especially adaptable for use as the oxide electrode in MHD power generation.

6 Claims, 2 Drawing Figures

METHOD FOR BONDING CERAMICS WITH METAL

The present invention relates to a method for bonding ceramics material with metal material.

In bonding a ceramic material with a metal material by treating the two materials at high temperatures, it is necessary for the thermal expansion coefficient of the ceramic material to coincide with that of the metal material in order to prevent the destruction of the bonded portion due to the thermal stress produced during the cooling process. When a bonded body of a ceramic material and a metal material is to be used under such conditions that the ceramic portion thereof is exposed to high temperatures while the metal portion is subjected to cooling, a large thermal stress is produced especially in the bonded portion due to the temperature difference between said two portions, even if their thermal expansion coefficients are equal. As a result, the destruction of the bonded portion is caused.

An object of the present invention is to provide a method for easily bonding a ceramic material with a metal material having a different thermal expansion coefficient.

Another object of the present invention is to provide a method for bonding a ceramic material with metal material in mechanically, thermally and electrically stabilized state.

The method according to the present invention is especially effective in manufacturing oxide electrodes for MHD power generation. The surface of said electrode is exposed to a high-speed gas having a temperature of about 2,500°C. Accordingly, it is necessary to cool said electrode from the reverse side thereof so as to prevent the temperature of its surface from rising too high. Since there is a big discrepancy of temperature between the surface and reverse side of said electrode, it is easily destroyed due to the thermal stress produced. In order to take out electric current, it is also necessary to bond a metal material to an oxide electrode in such a manner that electrical conductivity is obtained.

According to the present invention, a paste compound of glass having a low fusion point and a metal powder is fired on a ceramic material to form a very thin metallic film thereon. A metal body of easily deformable shape is then sandwiched between this film and the metal material to which the ceramic material is to be bonded and the contact points on either side are bonded to the respective materials by firing.

Figure 2:
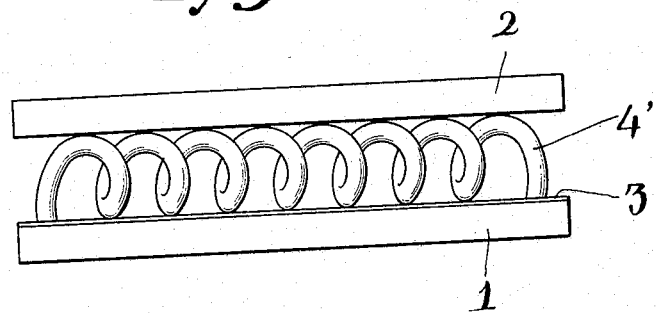

Other objects and advantages of the present invention will become apparent from the following detailed description which is to be read in conjunction with the accompanying drawing in which:

FIG. 1 is a perspective view, partially in section, showing a bonded body of a ceramic material and a metal material prepared according to the method of the present invention; and FIG. 2 is a cross sectional view of another embodiment of the method of the present invention.

Referring to the drawing, a paste composed of glass having a low fusion point and metal powder is fired on a ceramic material 1 in order to form a very thin metallic film 3 thereon.

The metal powder to be used for forming the film 3 on the surface of the ceramic material varies with the kind of the metal material 2 to be bonded. For example, if silver is used, silver and/or copper powder should be preferably used. Chromium and/or nickel powder is preferable when stainless steel, nichrome, Inconel or the like is bonded with a ceramic material.

Said paste of metal powder and glass having a low fusion point is applied to the surface of a ceramic material, which is then fired at a temperature ranging from about 700°C to 1,400°C in order to form a metallic film of 0.05–0.1 mm in thickness. Since said metallic film is quite thin, it does not come off from the surface of the ceramic material due to thermal stress at high temperatures, even if the thermal expansion coefficient thereof is different from that of the ceramic material.

The metal body 4 formed in an easily deformable shape is inserted between the metallic film 3 and the metal material 2. The contact points on either side are bonded to the respective materials by firing. Silver, stainless steel, nichrome, Inconel or silver-nickel alloy is suitable for the metal body 4 of easily deformable shape.

Shown in FIG. 1 is a metal body 4 having a wavy shape, while the metal body 4' shown in FIG. 2 is of a coil shape. However, the shape is not limited to these along as the metal body remains easily deformable.

If the bonded ceramic-metal body manufactured according to the above-described method is used under such a condition that the surface of the ceramic portion is exposed to a temperature of 2,500°C and the metal portion is cooled below 100°C, the ceramic portion does not peel off from the metal material, even if their expansion coefficients are different. This is because the easily deformable metal body inserted between them absorbs the difference of their expansion coefficients through deformation. The intervention of such a metal body also insures the electrical connection of these two materials. Accordingly, bonded bodies of ceramic materials and metal materials in any combination can be manufactured.

If a metal layer having a lower fusion point is provided at points where a metallic film formed on a ceramic material is bonded with easily deformable metal body and the easily deformable metal body is bonded with another metal material, bonding is further promoted.

The following examples are further illustrative of the present invention, and it will be understood that the invention is not limited thereto.

EXAMPLE 1

A paste composed of 75% Ag powder, 15% Cu powder and 10% glass powder having a low fusion point was applied to a sintered lanthanumchromite body having high heat resisting property and high electrical conductivity, which was then fired at a temperature of 1,000°C to form a metallic film of about 0.1 mm in thickness. A paste of 85% Ag powder and 15% Cu powder was applied to said film. Said paste was also applied to one side of a silver plate. A coil of 1 mm in inner diameter made of 0.5 mm silver wire was inserted between said film and silver plate. They were bonded through firing at about 930°C.

The thus prepared bonded body of lanthanumchromite and silver was not destroyed due to thermal stress when it was placed into an electrical oven at 1,600°C while said silver plate was being brazed to a water-cooled copper. Electrical resistance on the bonded surface was very low.

EXAMPLE 2

A paste composed of 40% Cr powder, 40% Ni powder and 20% glass powder having a low fusion point was applied to a sintered alumina body having high heat resisting property and thermal shock resistance, which was then fired at a temperature of about 1,400°C to form a heat-resistive and oxidation resistant metallic film of about 0.1 mm in thickness. A paste comprised of Cr powder and Ni powder was applied to said film, on which a coil made of stainless steel wire was placed. Further, said paste of Cr and Ni was applied to said coil, on which a stainless steel plate to be bonded was placed. They were bonded through firing at about 1,400°C.

The thus prepared bonded body of alumina and nichrome could withstand sudden temperature changes or large temperature gradient and was not destroyed when used in the temperature range up to about 1,300°C.

The same results were obtaineed by using nichrome, Inconel and silver-nickel alloy coils in place of stainless steel coils.

I claim:

1. A method for bonding ceramic material with metal material comprising the steps of forming a thin metallic film on the surface of a ceramic material, inserting at least one metal body deformably shaped between said metallic film on the ceramic material and a metal material to be bonded therewith, and bonding a plurality of spaced contact points on either side of said metal body to the respective materials by firing wherein said at least one metal body is shaped as a coil having a plurality of crests which constitute said contact points.

2. The method as set forth in claim 1, wherein said metallic film is formed by firing a paste composed of glass powder having a low fusion point and at least one metal powder selected from silver, copper, chrominum and nickel on a ceramic material at 700°–1,400°C.

3. The method as set forth in claim 1, wherein said easily deformable metal is a metal selected from the group consisting of silver, stainless steel, nichrome, Inconel and silver-nickel alloy.

4. The method, as set forth in claim 1, wherein said at least one metal body is shaped undulatingly defining a plurality of crests which constitute said contact points.

5. A method, for bonding ceramic material with metal material comprising the steps of forming a thin metallic film on the surface of a ceramic material, inserting a metal body of readily deformable shape between said metallic film on the ceramic material and a metal material to be bonded therewith, and bonding a plurality of contact points on either side of said metal body by firing such that the contact points of said metal body are bonded, respectively, to said metallic film on said ceramic material and said metal material, to ensure electrical conductivity therebetween wherein said metal body is shaped as a coil having a plurality of crests which constitute said contact points.

6. The method, as set forth in claim 5, wherein said bonding step includes, exposing the surface of said metallic film on said ceramic material to a temperature of about 2,500°C, and cooling said metal material to a temperature of less than 100°C to produce said electrical conductivity.

* * * * *